United States Patent [19]

Rowe

[11] 4,221,889
[45] Sep. 9, 1980

[54] DIVINYL POLYESTER MOLDING COMPOSITIONS

[75] Inventor: Eugene H. Rowe, Akron, Ohio

[73] Assignee: The B. F. Goodrich Company, Akron, Ohio

[21] Appl. No.: 45,167

[22] Filed: Jun. 4, 1979

[51] Int. Cl.² ............................................. C08L 63/00
[52] U.S. Cl. ................................... 525/404; 525/407; 525/922
[58] Field of Search ......................... 525/404, 407, 922

[56] References Cited

U.S. PATENT DOCUMENTS

| | | | |
|---|---|---|---|
| 3,830,874 | 8/1974 | Vasil | 525/407 |
| 4,101,604 | 7/1978 | Rowe | 525/10 |

*Primary Examiner*—Paul Lieberman
*Attorney, Agent, or Firm*—Nestor W. Shust

[57] ABSTRACT

Molding compositions containing a divinyl polyester resin, a polymerizable monomer, an epihalohydrin and, optionally, catalyst and other additives. The epihalohydrin improves the toughness of the divinyl polyester molding compositions.

10 Claims, No Drawings

DIVINYL POLYESTER MOLDING COMPOSITIONS

BACKGROUND OF THE INVENTION

Thermosetting divinyl polyester resin is often used in molding compounds, in casting or in laminate matrix material. Unfortunately, divinyl polyester resins are inherently brittle. Therefore, whenever divinyl polyester resins are used as a matrix, it must be toughened. Normal industry practice is to add a flexibilizer to the resin composition. However, this often results in a significant reduction in the mechanical properties which is unacceptable for many product applications. It is desirable to toughen divinyl polyester resin compositions without significant adverse effects on other important properties, such as cure rate, maturation and strength.

SUMMARY OF THE INVENTION

A molding composition containing divinyl polyester resin(s) and polymerizable monomer(s) and 1 to 30 parts by weight of an epihalohydrin polymer per 100 parts by weight of the combined weight of the polyester resin and the polymerizable monomer has greatly improved tougheners while substantially retaining its other physical properties.

DETAILED DESCRIPTION

This invention is directed to divinyl polyester resin molding compositions which possess improved toughness. More specifically, the divinyl polyester molding compositions comprise (a) a divinyl polyester resin, (b) a polymerizable monomer, and (c) from about 1 to about 30 parts by weight of an epihalohydrin polymer per 100 parts by weight of the combined weight of said polyester resin and polymerizable monomer.

Divinyl ester resins employed in the composition of this invention are resins obtained from a diglycidyl ether of bisphenol A and acrylic or methacrylic acid. Such resins may be represented by the following skeletal structure

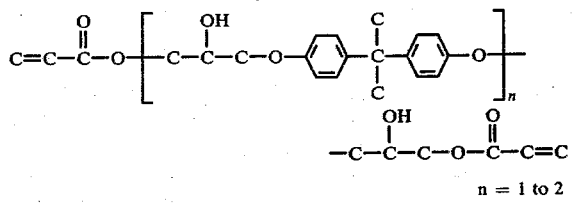

n = 1 to 2

Divinyl ester resins are sold commercially as DERAKANE vinyl ester resins by the Dow Chemical Company, or as ATLAC Resins by the Atlac Chemical Company and others.

The polyester resin is dissolved in a solvent comprising at least one polymerizable monomer which is co-polymerizable with the dissolved polyester. The polymerizable monomer not only acts as a solvent but also copolymerizes with the unsaturated groups along the polyester chain. Polymerizable monomers which can be used in this invention include polymerizable vinylidene compounds having at least one terminal $CH_2<$ group and containing 2 to 12 carbon atoms, preferably 3 to 10 carbon atoms. A wide variety of these compounds are known including both aliphatic and aromatic unsaturated hydrocarbons and hydrocarbon derivatives, such as esters, acids and nitriles. Examples of suitable polymerizable monomers are styrene, methyl styrene, acrylonitrile, methyl acrylate, methyl methacrylate, vinyl acetate, allyl esters of phthalic, adipic, maleic, malonic, and cyanuric acids. Styrene and methyl styrene are particularly useful polymerizable monomers. Commercial divinyl polyester resins are normally sold as a liquid solution with the unsaturated polyester resin dissolved in the polymerizable monomer.

Epihalohydrin polymers used as toughners in this invention can be an epihalohydrin homopolymer, a copolymer of two or more epihalohydrin monomers, or a copolymer of an epihalohydrin monomer(s) with an oxide monomer(s).

The epihalohydrin monomers have the formula

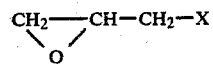

where x is Cl, Br, I, or F. More preferredly, x is selected from Cl and Br. From a cost and availability standpoint, the preferred monomer is epichlorohydrin. Other halogen-bearing epoxide monomers can be used in partial replacement of the epihalohydrin monomer(s). Examples of these monomers are 4-chloro-1,2-epoxy butane; 4-bromo-1, 2-epoxy butane; 1-(1,3-dichloroisopropoxy)-2,3-epoxypropane; 4,4,4-trichloro-1,2-epoxy butane; 1-bromoethyl glycidyl ether; 1,1,1-trichloroethyl glycidyl ether; 1,1,1-trifluoroethyl glycidyl ether; 1,2-epoxy-2-methyl-4,6,6,6,-tetrachlorohexane; 1,2-epoxy-4-oxo-8,8,8-trichlorooctane; and the like.

The oxide monomers contain a cyclic oxy

ring therein. Examples of these monomers are alkylene oxides such as ethylene oxide, propylene oxide, butylene oxide, isobutylene oxide, octylene oxide, and the like; cycloaliphatic oxides such as cyclohexene oxide, vinyl cyclohexene oxide, and the like; glycidyl ethers such as methyl glycidyl ether, ethyl glycidyl ether, isopropyl glycidyl ether, n-hexyl glycidyl ether, phenyl glycidyl ether, and the like; glycidyl acrylate and glycidyl methacrylate; allyl glycidyl ether; styrene oxide; and 4- and 5- membered oxy ring compounds such as Furan and methyl substituted Furan, and the like. Of the oxide monomers, the alkylene oxides containing two to about eight carbon atoms are preferred.

Examples of more preferred epihalohydrin polymers are polyepichlorohydrin, polyepibromohydrin, epichlorohydrin-epibromohydrin copolymer, epichlorohydrin-ethylene oxide copolymer, epibromohydrinethylene oxide copolymer, epichlorohydrin-propylene oxide copolymer, and epichlorohydrin-ethylene oxidepropylene oxide terpolymer. Excellent results have been obtained with a homopolymer of epichlorohydrin.

Copolymers of epihalohydrin monomers and oxide monomers comprise at least 50% to 100% by weight (i.e., homopolymers) of polymerized units of epihalohydrin monomer(s), and up to 50% by weight of polymerized units of an oxide monomer(s). Preferably, the polymers contain from about 65% to 100% by weight of polymerized epihalohydrin monomer(s).

Epihalohydrin polymers suitable for use as tougheners for divinyl polyester resins are of low molecular weight and will vary in form from fluid liquids to thick semisolids. The number average molecular weight (Mn) of such polymers normally will vary from about 800 to about 50,000, preferably from about 2000 to about 15,000. The molecular weight is normally specified in terms of "Reduced Solution Viscosity" or "RSV" which is a point value viscosity determined as the viscosity at 25° C. of a solution of 0.4 gram of polymer dissolved in 100 ml. of dimethyl formamide containing 3% by volume of acetylacetone (expressed as deciliter per gram or dl./g.). The range of RSV corresponding to the number average molecular weight range given above will be from about 0.025 to about 0.5, preferably from about 0.075 to about 0.3. The epihalohydrin polymers have a bulk viscosity of from about 500 cps. to about 50,000,000 cps (measured at 27° C. using a Brookfield Viscometer). To facilitate handling, the bulk viscosity of the epihalohydrin polymer can be reduced by blending the polymer with the dissolving polymerizable monomer. This may be desirable for high viscosity polymers. Liquid epichlorohydrin polymers were found to be excellent tougheners for unsaturated polyester resins.

Epihalohydrin polymers suitable for use in this invention can be prepared according to U.S. Pat. No. 3,850,856 (incorporated herein by reference) and U.S. Pat. No. 3,850,857 (incorporated herein by reference).

The level of epihalohydrin polymer(s) used is from about 1 to about 30 parts by weight, preferably from about 1 to about 15 parts by weight, said weight parts being based on 100 parts by weight of the polyester resin and the polymerizable monomer.

In addition to the polyester resin, the polymerizable monomer and the epihalohydrin polymer, the molding compositions of this invention may include other ingredients such as fillers, mold lubricants, catalysts, thickening agents, low profile additives, reinforcing fibers, flame and smoke retardants, and coloring agents. A more detailed disclosure of the above listed ingredients is contained in U.S. Pat. No. 4,101,604 which disclosure is incorporated herein by reference.

A catalyst system comprises any of the well-known free-radical catalysts and, optionally, a catalyst promoter or accelerator. Examples of free-radical catalysts are peroxides and hydroperoxides such as benzoyl peroxide, cumene peroxide and hydroperoxide, lauroyl peroxide, t-butyl peroxide and hydroperoxide, methylethyl ketone peroxide, and the like; persulfates such as sodium, potassium and ammonium persulfate; azobisisobutyronitrile, and t-butyl perbenzoate, and the like. Catalyst promoters or accelerators include metal salts such as cobalt, tin, and lead salts like cobalt naphthenate or octoate; and amines such as dimethylaniline, triethylamine, triethanolamine, and the like; and compounds like triphenylphosphine. The total weight of the free-radical catalyst system, whether or not a catalyst promoter is used, is from about 0.1 part to about 5 parts, more preferably from about 0.5 part to about 3 parts by weight based upon 100 parts by weight of the liquid vinylidene-terminated polymer. p In order to evaluate the compositions of this invention for toughness and other properties, standard industry tests may be used. ASTM tests can be used for conventional mechanical properties such as D-790 for flexure and D-638 for tension, both with nominal 6.35 mm thick samples. Izod testing was done on samples that were unnotched and impacted normal to the molding surface. Other tests were used to measure shrinkage in the mold and Barcol hardness. Fracture toughness was evaluated by the Gardner dart impact test and by an acoustic emission test designed to measure crack development during bending. The Gardner impact and acoustic emission tests warrant more detailed description.

For the Gardner impact test, an instrument is used which comprises a base plate, a round-nosed steel rod impact weight, a slotted tube having inch-pound graduations in which the rod is lifted and dropped, and a bracket to hold the tube in a vertical position. Impact resistance is determined by subjecting either side of a sample panel to an impact of up to 320 inch-pounds, depending upon the weight dropped. The sample panel is placed over a 12.7 mm hole in the base plate; the steel rod weight is raised by lifting an attached pin until the pin coincides with the desired inch-pounds graduation mark on the slotted tube, and then dropped. The sample panel is examined for cracking or failure after each impact. The test used a 1.59 mm radius dart on a 6.35 mm sample panel. A two-pound weight was dropped from various heights onto the ring supported sample. The resultant damage was determined by detecting cracking on the reverse side of the sample. The detection was made relatively easy by inking the reverse side and then wiping it clean; the ink clearly identified the local cracking from the impact. The dart weight multiplied by the drop height at the onset of detectable cracking determined the reported Gardner impact value in inch-pounds.

Tensile Strength data was obtained following the procedure of ASTM-D-638-77a and Heat Distortion Temperature data was obtained following the procedure described in ASTM-D-648-72. Data from the above tests is presented below in Table I.

The compositions that were used for testing were prepared by mixing 100 parts of divinyl polyester resin (DERAKANE 411-45 manufactured by The Dow Chemical Company), with 20 parts of liquid polyepichlorohydrin which was proposed according to U.S. Pat. No. 3,850,856 and had a number average molecular weight of about 600. To the mixed liquid ingredients was then added 0.5 part of cobalt naphthanate which was in the form of a 10% solution and mixed for an additional 15 minutes. Thereafter, 2.0 parts of methylethyl ketone peroxide was added and the mixture was mixed for a further three minute period. The resulting liquid was then poured into a ¼ inch (0.635 cm) vertical mold and cured for one hour at 60° C. and for one hour at 120° C. The specimen were then cut to the size required by the respective ASTM tests. A control sample was also prepared according to the above described procedure except that no polyepichlorohydrin was added. Various test results for the above described composition of this invention and the control composition are reported below.

TABLE I

| TEST | Control | Samples 1 | Samples 2 |
|---|---|---|---|
| Gardner Impact (in.-lb) | 1.47 | 1.92 | 2.49 |
| Tensile Stress (psi) | 11.6 | 14.2 | 14.9 |
| Tensile Modulus (psi $\times 10^6$) | 6.16 | 6.11 | 5.91 |

TABLE I-continued

| TEST | Control | Samples 1 | 2 |
|---|---|---|---|
| Heat Distortion | 96 | — | 86 |

The above test results show that the toughness is greatly improved in the composition containing epichlorohydrin (sample 1) as is shown by the Gardner impact test results. Other important properties such as tensile stress are not adversely effected.

The divinyl polyester molding compositions of this invention have many uses including automotive parts, chairs, trays and the like.

What is claimed is:

1. A divinyl polyester molding composition comprising:
   (a) a divinyl polyester resin, having the following skeletal structure

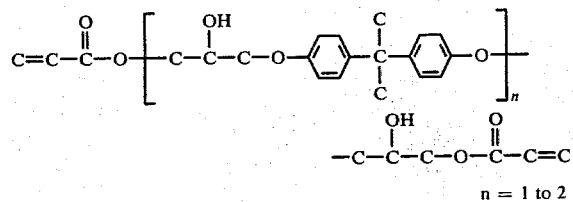

n = 1 to 2

(b) a polymerizable monomer,
   (c) from about 1 to about 30 parts by weight of an epihalohydrin polymer per 100 parts by weight of the combined weight of said unsaturated polyester resin and polymerizable monomer.

2. A composition of claim 1 wherein the epihalohydrin polymer has a number average molecular weight of from about 800 to about 50,000.

3. A composition of claim 2 containing a catalytic amount of a catalyst selected from the group consisting of benzoyl peroxide, tertiary butyl perbenzoate, cyclohexanone peroxide, tertiary butyl peroxide, tertiary butyl peroctoate, azoisobutyrodinitrile, and cumene hydroperoxide.

4. A composition of claim 2 wherein the level of epihalohydrin polymer is from about 1 to about 15 parts by weight per 100 parts by weight of the combined weight of said divinyl polyester resin and polymerizable monomer.

5. A composition of claim 4 wherein the epihalohydrin polymer is selected from the group consisting of a homopolymer of an epihalohydrin monomer and an oxide monomer containing a cyclic oxy ring.

6. A composition of claim 5 wherein the epihalohydrin polymer is a homopolymer of epichlorohydrin.

7. A cured composition of claim 1.

8. A process for producing a moldable divinyl polyester composition of claim 1 which comprises mixing at least one divinyl polyester resin with at least one polymerizable monomer and from about 1 to about 30 parts by weight of epihalohydrin polymer per 100 parts by weight of the combined weight of said divinyl polyester resin and said polymerizable monomer.

9. A process of claim 8 wherein the epihalohydrin polymer has a number average molecular weight of from about 800 to about 50,000.

10. A shaped article of a composition of claim 1.

* * * * *